April 27, 1943. D. D. PEEBLES ET AL 2,317,479
CORN SUGAR PRODUCT AND METHOD
Filed Jan. 27, 1940
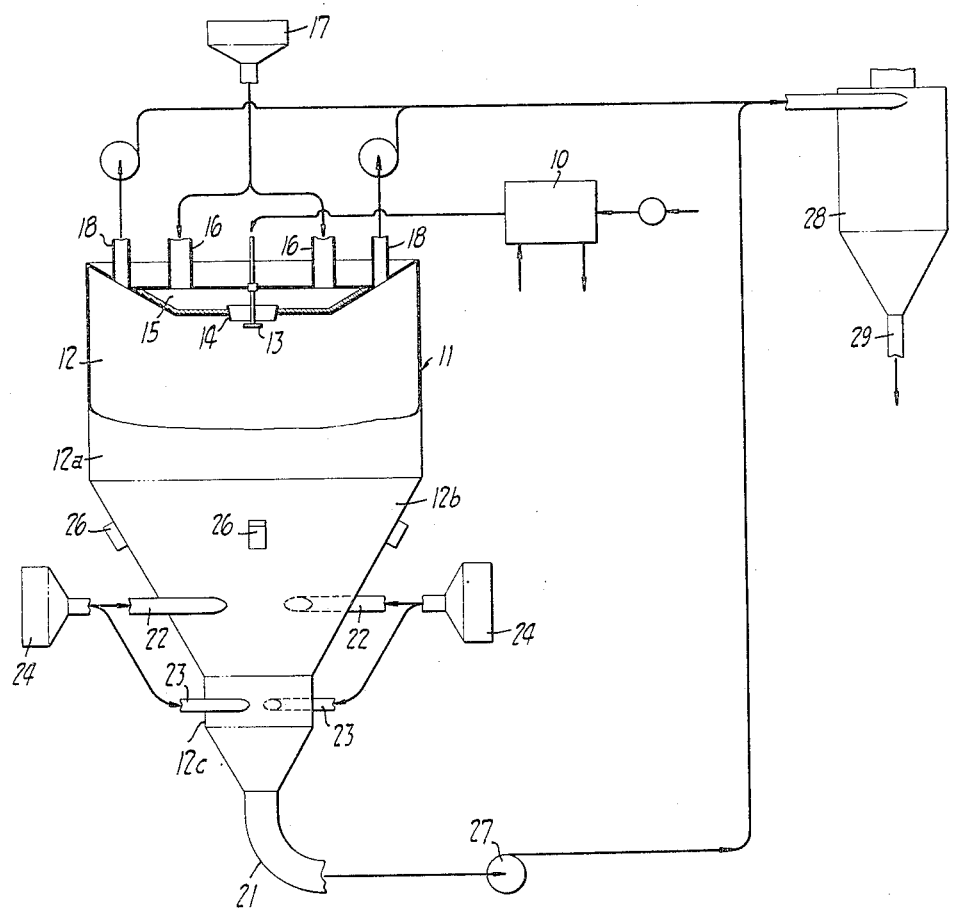
INVENTORS
DAVID D. PEEBLES
PAUL D. V. MANNING
BY
ATTORNEY Patented Apr. 27, 1943

2,317,479

UNITED STATES PATENT OFFICE 2,317,479

CORN SUGAR PRODUCT AND METHOD

David D. Peebles, Berkeley, and Paul D. V. Manning, Berkeley Woods, Calif., assignors to Golden State Company, Ltd., San Francisco, Calif., a corporation of Delaware Application January 27, 1940, Serial No. 315,912

4 Claims. (Cl. 127—30)

This invention relates generally to products containing sugars resulting from the conversion of starch or starch bearing materials. More particularly, the invention relates to methods for the treatment of corn syrup, and to dry corn sugar containing products resulting from such methods.

It is an object of the present invention to provide a method of the above character which will result in a new corn sugar product in divided solid form, having properties not possessed by corn sugars or sugar products made by prior methods.

A further object of the invention is to provide a method of the above character which when applied to materials like corn syrup serves to condition and modify the character of the sugars in the final product, thereby producing a new product of enhanced value.

Further objects of the invention will appear from the following description in which the preferred embodiment of the invention has been set forth in conjunction with the accompanying drawing.

In the manufacture of certain sugars like dextrose, or products containing dextrose, it is common to form the sugars by hydrolyzing certain starches or starch bearing materials, as for example starch made from Indian corn, rice, tapioca, or potatoes. The percentage of dextrose to dextrines and other sugars formed, such as maltose, depends upon the extent of conversion. With reference particularly to manufacture of syrups from corn starch, conversion of the starch results in formation of so-called "corn syrups" which contain dextrose, maltose and dextrines. In the present instance we are particularly concerned with starch conversion syrups or mixtures thereof having a reducing sugar content calculated as dextrose of approximately 30% to 55% (dry basis), or mixtures of such syrups. Maltose is present in such syrups in relatively large percentages ranging from approximately 35 to 45% (on dry basis) within the above mentioned conversion range of from 30 to 55%. (See article by Fetzer, Evans & Langendecker, Industrial Engineer and Chemistry, March 15, 1935.)

There is a commercial market for a dry divided product containing all of the solids of corn syrup. In the past such products have been manufactured by first concentrating the syrup, and then subjecting it to further drying under partial vacuum, after which it is allowed to cool and harden in forms. The hardened slabs are then ground to form a divided material of the desired fineness.

Certain of the sugars present in corn syrup, particularly maltose and dextrose, when in aqueous solutions, are capable of existing in two forms known as alpha and beta. With respect to dextrose, there is little if any change in the ratio between alpha and beta forms with changes in temperature. However, maltose when in solution has a definite equilibrium ratio between alpha and beta forms, which changes with changes in temperature. With an increase in temperature, the ratio is shifted towards the alpha form, or in other words the percentage of maltose in the alpha form increases with increased temperature. When a dried product is produced from corn syrup by a process as previously described, involving hardening of the material in slabs, most of the maltose is finally in the beta form. This is because such prior processes operate at relatively low temperatures to avoid discoloring the product, and to avoid impairment of flavor such as results from heating for relatively long periods at elevated temperatures. Furthermore, the change from liquid to solid form occurs slowly with the result that the final ratio of alpha and beta maltose in the product is not determined by temperatures used during intermediate steps of the process. Therefore, the ratio in the final solid product is such that a larger amount of the maltose is in the beta form.

According to the present invention, corn syrup is treated in such a manner that the equilibrium ratio of maltose is towards the alpha form, and then the material is converted into a dry powder so rapidly that the equilibrium ratio does not have an opportunity to readjust itself. Thus, in the final product there is a relatively higher percentage of maltose in the alpha form than in products produced by prior processes, such as previously described.

In the drawing suitable apparatus for carrying out the process has been shown diagrammatically. This apparatus includes a heater 10 and a spray type desiccator 11. The desiccator should be one in which particular provision is made to avoid adhering of material to the side walls, as for example a desiccator of the type disclosed and claimed in co-pending application, Serial No. 315,432, filed January 24, 1940. Briefly, such a desiccator includes a chamber 12, within which there is a centrifugal atomizing nozzle 13. Above the atomizing nozzle there is a conical shaped collar 14 through which hot drying gas is introduced from the chamber 15. Chamber 15 receives hot gas from the conduit 16, which in turn connects with the air heater 17. The conduits 18 connect with the upper end of chamber 12 and serve to exhaust gas. The upper portion 12a of chamber 12 can be cylindrical shaped, and the lower portion 12b conical shaped. The lower end of portion 12b connects to a cylindrical extension 12c, which in turn connects with the discharge conduit 21. Conduits 22 connect tangentially with the conical portion 12b, and serve to introduce additional hot drying gas into the chamber. Also, conduits 23 connect tangentially with the extension 12c and serve to introduce further hot gas. Both the conduits 22 and 23 are shown connected to common air heater 24. Mechanical vibrators 26 are shown applied to the side walls of the desiccating chamber, and serve to intermittently or continuously vibrate the walls in a lateral direction at a rapid rate and thereby prevent adherence of the particles to the inner surfaces of the side walls. Without such vibrators, particles may tend to come to rest on the sloping walls of conical portion 10b, with resulting sticking of the particles.

Discharge conduit 21 is shown connected to the blower 27 which discharges the material to the cyclone separator 28. This separator in turn delivers the desiccated material at 29, after which it may be further cooled, classified and placed in cartons or sacks.

In operating the desiccating equipment described above, hot air is supplied through conduits 16 at a suitable drying temperature, as for example of the order of 320° F. Gas being removed through conduits 18 can be of the order of 235° F. Gas introduced through conduits 22 and 23 can be at a somewhat lower temperature than the gas introduced through conduit 18, as for example of the order of 200° F. With the values just given, the air being withdrawn with the desiccating material through conduit 21 can be of the order of 190° F. Most of the moisture content is removed in the desiccating chamber, although some further moisture is removed in transit to the separator 28.

Throughout the system the wet bulb temperature of the air is sufficiently low that the product after once being converted to a solid does not melt. Conversion of the material to a solid takes place instantaneously within a primary zone of desiccation in the vicinity of nozzle 13, simultaneously with evaporation of most of the moisture content. Conversion to solid form is due not only to removal of moisture, but also to the chilling effect on the drying gas and on the particles due to rapid evaporation of moisture. From the primary zone of desiccation the solid material progresses downwardly into the lower part of chamber portion 12a and eventually into chamber portion 12b and extension 12c, where it is treated to secondary drying for further removal of moisture. During such secondary treatment the particles are not melted since their temperature is controlled by the wet bulb temperature of the air, rather than the dry bulb temperature, and the wet bulb temperature is well below the temperature at which the material becomes sticky. An intense vortex is formed in the lower portion of the desiccating chamber, which together with the mechanical vibrators 26 prevents adherence of the material upon the side walls of the chamber.

To carry out the present process, a starch conversion syrup of the character previously described is subjected to evaporating and refining treatment to produce a colorless concentrate containing say 75% solids. This concentrated syrup is then supplied to the closed heater 10 which is of the high velocity flow type capable of rapidly heating the material to a relatively high temperature. To secure the results desired according to the present invention, it is preferable to heat the concentrated syrup to temperatures of the order of from 200° F. to 300° F. Immediately thereafter the syrup, while under pressure, is supplied to the atomizing nozzle 13 where the pressure is released and the material simultaneously atomized. The period of treatment from the time the hot concentrated syrup is atomized and dried to form a solid is virtually instantaneous.

Heating to elevated temperatures of the order specified causes a shift in the equilibrium ratio between alpha and beta forms of sugar and toward the alpha form, which is maintained up to the instant of atomization. Drying to solid form follows substantially instantaneously after atomization, and therefore the equilibrium ratio does not have an opportunity to readjust itself. Ordinarily the heating of corn syrup to temperatures of the order of from 200 to 300° F. would be deemed deleterious to color and flavor. In the present process it is feasible to utilize such temperatures because the syrup is held at such temperatures only for a short interval and while it is flowing continuously at relatively high velocities over heated surfaces, whereby there is no material impairment of color or flavor.

The dry product resulting from the present process has many properties which distinguish it from products made by prior processes. In general, it is a non-crystalline solid, which is relatively white in color compared to products involving evaporation, caking and grinding. The particles tend to be hollow spheres or fragments of spheres, with some flakes, as distinguished from solid ground fragments. It has a relatively low apparent density compared to products made by prior processes. It dissolves rapidly in water and can be readily incorporated with oils and fats. This facilitates incorporating the product with other materials such as aqueous mixes, shortenings, or mixes containing a shortening.

A particular characteristic of the material is its ability to withstand various climatic conditions when packed in paper cartons. Powder material made by grinding hardened slabs of the material will form a hard cake when exposed to an atmosphere of fair humidity. This is due to a cementing action between the particles as a result of surface moisture acquired from the atmosphere. Under like conditions, our material may cake to some degree, but the cake is readily friable, and therefore does not detrimentally affect salability or use by the trade. The precise reason for this property of the material is not clearly understood, but it seems to be due in part to the altered condition of the maltose by virtue of heat treatment followed by spray drying. A portion of the alpha maltose can be defined as being in a metastable state, and is fixed in this state as long as the material is kept free from moisture.

It has also been found that our product gives results superior to prior dried corn syrup products, when used in the baking industry. It has been known that solidified starch conversion syrups can be used to advantage in the baking industry for making various pastry products such as pies, cakes, and the like, or fillers such as are employed in sweet wafers. As distinguished from solid corn syrup products available in the past, our product is definitely superior for such purposes. It mixes more readily with various shortenings and with bakery mixes including for example flour, shortening, water and seasoning. When mixed with shortenings, it forms a superior filler which is relatively stable and is free of all graininess. When employed in bakery mixes such as are used in pie making, it forms a crust which affords a uniform bake without streaks, and which browns more quickly. The ability of cake and pie mixes to brown quickly and uniformly is important in the bakery industry in that it facilitates control of the baking operation to obtain products of uniform quality. When used with cream or whipped fillers, it forms a superior whip of high viscosity which is free of all graininess. One obtains a whip with less mechanical beating due to the air incorporated in the solid particles, which is automatically incorporated into the mix. For the same reason, use of the material in cake mixes causes a leavening effect.

The material can also be used to advantage in making "ice cream" mixes or mixes used in making frozen food products. It imparts a high degree of viscosity and overrun to the mix, and the overrun is obtained more quickly than with prior products, due to the air incorporated into the mix from the particles.

With respect to the maltose content, when the material is dissolved in water there is a readjustment of the equilibrium ratio toward the beta form to correspond to the temperature of the solution. Therefore, it may be said that the maltose content of our product has a ratio between the alpha and beta forms, which differs from the ratio obtained in solution at normal room temperatures.

We claim:

1. In a method for the treatment of concentrated starch conversion syrups containing substantial amounts of maltose, rapidly heating the syrup to an elevated temperature of from about 200 to 300° F., and then rapidly converting the hot syrup to dry solid form by spray drying.

2. In a method of the character described, rapidly heating a concentrated corn starch conversion syrup to a temperature of from about 200 to 300° F., the syrup having a reducing sugar content calculated as dextrose of about 30% to 55%, atomizing the hot syrup, and enveloping immediately thereafter the atomized particles in a drying gas whereby the atomized particles are substantially instantaneously converted to dry solid form.

3. In a method of the character described, rapidly heating a concentrated corn starch conversion syrup to a temperature of from about 200 to 300° F., the syrup having a concentration of solids of the order of 75% and having a reducing sugar content calculated as dextrose of approximately 30 to 55% and a maltose content ranging from approximately 35 to 45%, atomizing the hot concentrated syrup and enveloping the atomized particles in a drying gas whereby the atomized particles are instantaneously converted to dry solid form.

4. In a method of the character described, rapidly heating a concentrated cornstarch conversion syrup to a temperature of from about 200° to 300° F., said syrup having a reducing sugar content calculated as dextrose from approximately 35 to 45%, and immediately thereafter atomizing the hot concentrated syrup into a drying gas to rapidly convert the atomized particles to dry solid form.

DAVID D. PEEBLES.
PAUL D. V. MANNING.